(12) United States Patent
James et al.

(10) Patent No.: US 9,700,941 B2
(45) Date of Patent: Jul. 11, 2017

(54) METHOD FOR REPAIRING A COMPONENT FOR USE IN A TURBINE ENGINE

(71) Applicant: Siemens Energy, Inc., Orlando, FL (US)

(72) Inventors: Allister W. James, Chuluota, FL (US); Zafir A. M. Abdo, Orlando, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1178 days.

(21) Appl. No.: 13/633,999

(22) Filed: Oct. 3, 2012

(65) Prior Publication Data
US 2014/0093415 A1    Apr. 3, 2014

(51) Int. Cl.
| | |
|---|---|
| *B22F 7/08* | (2006.01) |
| *B22F 5/04* | (2006.01) |
| *B23K 35/02* | (2006.01) |
| *B23P 6/00* | (2006.01) |
| *F01D 5/00* | (2006.01) |
| *B22F 3/00* | (2006.01) |
| *B23P 11/02* | (2006.01) |

(52) U.S. Cl.
CPC ............ *B22F 5/04* (2013.01); *B22F 7/08* (2013.01); *B23K 35/02* (2013.01); *B23K 35/0244* (2013.01); *B23P 6/005* (2013.01); *F01D 5/005* (2013.01); *B23P 11/025* (2013.01); *F05D 2230/22* (2013.01); *F05D 2240/307* (2013.01)

(58) Field of Classification Search
None
See application file for complete search history.

(56) References Cited

U.S. PATENT DOCUMENTS

| | | | |
|---|---|---|---|
| 4,214,355 A | 7/1980 | Zelahy | |
| 4,726,101 A | 2/1988 | Draghi et al. | |
| 5,822,852 A | 10/1998 | Bewlay et al. | |
| 5,935,718 A * | 8/1999 | Demo et al. | 428/577 |
| 6,332,272 B1 | 12/2001 | Sinnott et al. | |
| 6,558,119 B2 | 5/2003 | Lee et al. | |

(Continued)

FOREIGN PATENT DOCUMENTS

| | | |
|---|---|---|
| EP | 1721699 A1 | 5/2006 |
| EP | 1803521 A1 | 7/2007 |
| EP | 1982781 A1 | 10/2008 |

OTHER PUBLICATIONS

Han, J., G.M Sheng, and X.L Zhou. "ISIJ International vol. 48 (2008) No. 9 p. 1238-1245." ISIJ International 48.9 (2008): 1238-245. Diffusion Bonding of Surface Self-nanocrystallized Ti—4Al—2V and 0Cr18Ni9Ti by Means of High Energy Shot Peening. J-Stage. Web. May 1, 2015.*

*Primary Examiner* — Jeremy Jones

(57) ABSTRACT

A removed damaged portion of a fully consolidated turbine engine component is replaced with a powder coupon that includes powder particles that are at most partially sintered or are bonded together with a binder. A bonding agent is applied to the component and/or the powder coupon. The powder coupon is then positioned over the component and heat is applied to fully sinter the powder particles, thus causing the powder coupon to shrink onto the component. The heat also activates the bonding agent to bond the shrunken powder coupon to the component, but the heat does not sinter the material forming the fully consolidated component.

20 Claims, 3 Drawing Sheets

(56) References Cited

U.S. PATENT DOCUMENTS

| | | | |
|---|---|---|---|
| 6,837,417 B2 | 1/2005 | Srinivasan | |
| 6,908,288 B2 | 6/2005 | Jackson et al. | |
| 7,241,416 B2 | 7/2007 | Sweetland | |
| 7,278,829 B2 | 10/2007 | Roedl et al. | |
| 7,484,651 B2* | 2/2009 | Gandy et al. | 228/193 |
| 7,653,994 B2* | 2/2010 | Dasilva | B22F 7/062 228/119 |
| 8,141,225 B2* | 3/2012 | Tuppen | B22F 5/04 228/249 |
| 2004/0124231 A1* | 7/2004 | Hasz | B23K 35/3046 228/245 |
| 2005/0036893 A1 | 2/2005 | Decker | |
| 2005/0036898 A1 | 2/2005 | Sweetland | |
| 2007/0154338 A1* | 7/2007 | Sathian et al. | 419/5 |
| 2009/0183850 A1 | 7/2009 | Morrison et al. | |
| 2009/0255117 A1* | 10/2009 | Hovel | B23K 1/0018 29/889.1 |
| 2011/0041313 A1 | 2/2011 | James et al. | |
| 2011/0099810 A1* | 5/2011 | Stankowski | B22F 7/062 29/888 |
| 2012/0276361 A1* | 11/2012 | James | B28B 1/002 428/223 |

* cited by examiner

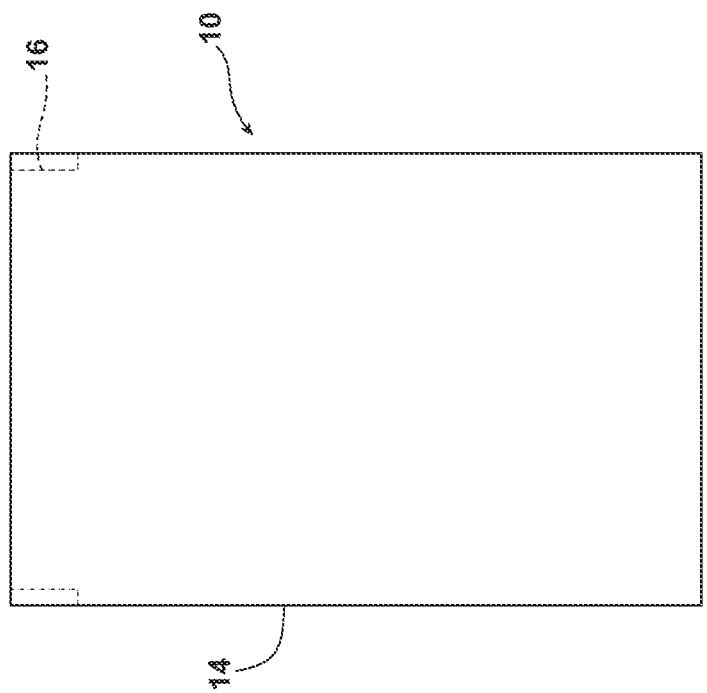
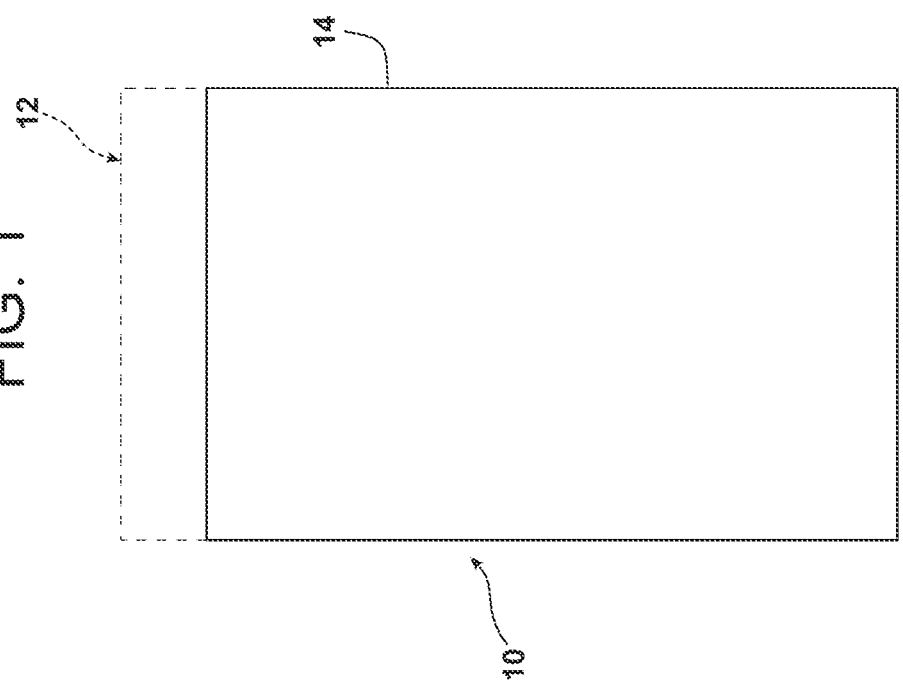

METHOD FOR REPAIRING A COMPONENT FOR USE IN A TURBINE ENGINE

FIELD OF THE INVENTION

The present invention relates to repairing fully consolidated components for use in turbine engines using partially sintered or bonded powder coupons that are shrunken onto and bonded to the fully consolidated component with a bonding agent.

BACKGROUND OF THE INVENTION

In a turbomachine, such as a gas turbine engine, air is pressurized in a compressor section then mixed with fuel and burned in a combustion section to generate hot combustion gases. The hot combustion gases are expanded within a turbine section of the engine where energy is extracted to provide output power used to produce electricity. The hot combustion gases travel through a series of stages when passing through the turbine section. A stage may include a row of stationary airfoils, i.e., vanes, followed by a row of rotating airfoils, i.e., blades, where the blades extract energy from the hot combustion gases for providing output power.

Since the components within the combustion section and the turbine section are directly exposed to the hot combustion gases, these components may become damaged and in need of repair.

SUMMARY OF THE INVENTION

In accordance with a first aspect of the present invention, a method is provided for replacing a removed damaged portion of a fully consolidated component for use in a turbine engine. A powder coupon is provided comprising powder particles that are at most partially sintered or are bonded together with a binder. A bonding agent is applied to at least one of an outer mating surface of the component and an inner mating surface of the powder coupon. The powder coupon is positioned over the component such that the inner mating surface of the powder coupon is located adjacent to the outer mating surface of the component with the bonding agent therebetween so as to form a replacement assembly comprising the component, the powder coupon, and the bonding agent. Heat is applied to the replacement assembly, wherein the applied heat fully sinters the powder particles of the powder coupon so as to bind the powder particles together, thus causing the powder coupon to shrink onto the component. The applied heat also activates the bonding agent to bond the inner mating surface of the shrunken powder coupon to the outer mating surface of the component. However, the applied heat to the replacement assembly does not sinter the material forming the fully consolidated component.

In accordance with a second aspect of the present invention, a method is provided for repairing a fully consolidated component for use in a turbine engine. A damaged portion of the component is removed, and an outer surface of the component adjacent to the location of the removed damaged portion is machined using a material removal procedure to form an outer mating surface comprising a stepped surface with an adjacent portion of the outer surface of the component. A powder coupon is provided comprising powder particles that are at most partially sintered or are bonded together with a binder. A bonding agent is applied to at least one of the outer mating surface of the component and an inner mating surface of the powder coupon. The powder coupon is positioned over the component such that the inner mating surface of the powder coupon is located adjacent to the outer mating surface of the component with the bonding agent therebetween so as to form a replacement assembly comprising the component, the powder coupon, and the bonding agent. Heat is applied to the replacement assembly, wherein the applied heat fully sinters the powder particles of the powder coupon so as to bind the powder particles together, thus causing the powder coupon to shrink such that the inner mating surface of the powder coupon is shrunken onto the outer mating surface of the component with the bonding agent therebetween. The applied heat also activates the bonding agent to bond the inner mating surface of the shrunken powder coupon to the outer mating surface of the component. The shrinking of the powder coupon onto the component exerts a pressure on the outer mating surface of the component so as to aid in the bonding process between the inner mating surface of the shrunken powder coupon and the outer mating surface of the component. The applied heat to the replacement assembly does not sinter the material forming the fully consolidated component.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 1 is a schematic illustration of a component for use in a turbine engine of the type to be serviced in accordance with the present invention, wherein the component includes a damaged portion;

FIG. 2 is a schematic illustration of the component illustrated in FIG. 1 after a step of a servicing operation has been implemented to remove the damaged portion from the component;

DETAILED DESCRIPTION OF THE INVENTION

Figure 3:
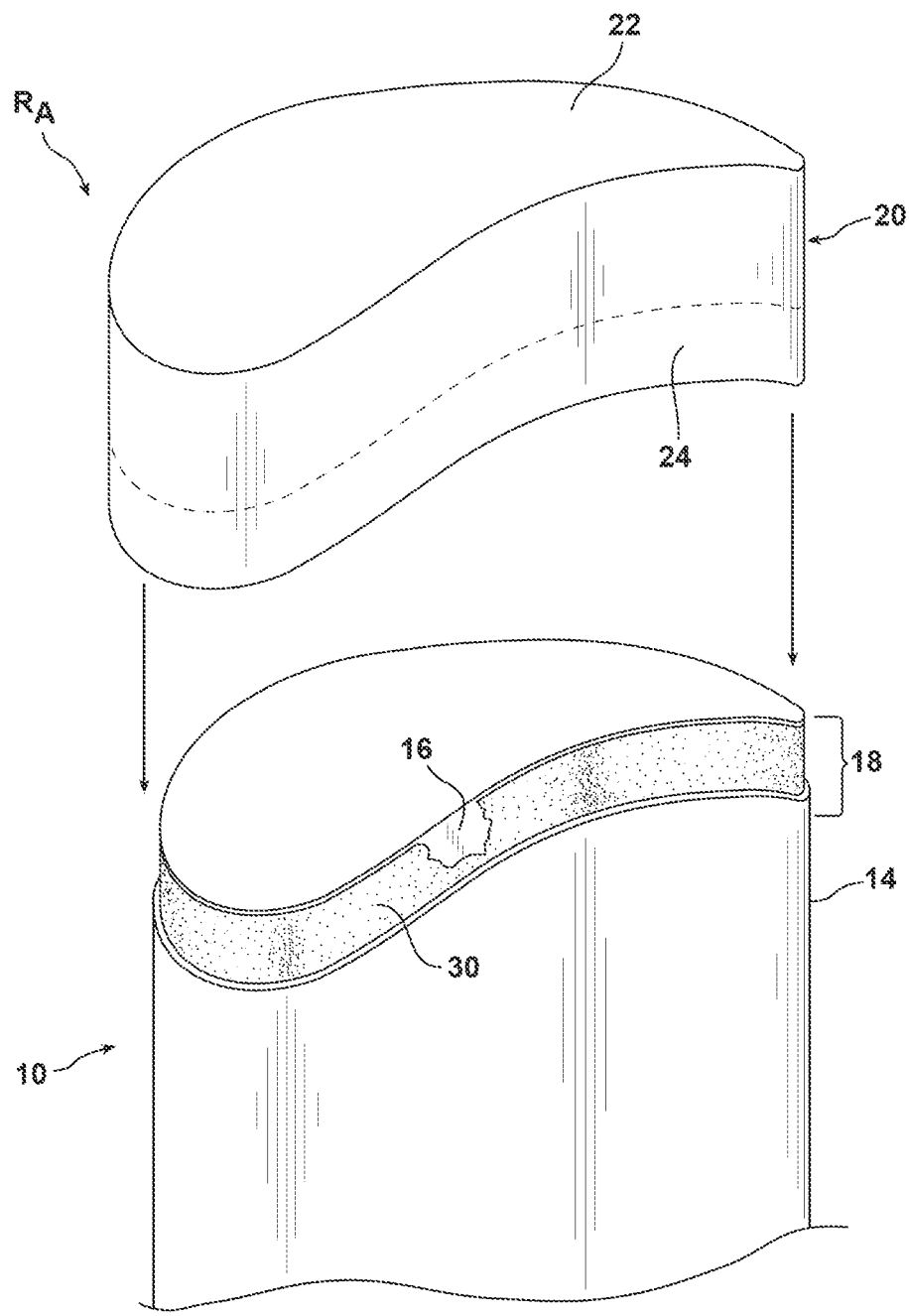
FIGS. 3 and 4 are perspective (FIG. 3) and schematic (FIG. 4) illustrations of the component of FIG. 1 undergoing another step in the servicing operation.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

After periods of use, it may become necessary to replace portions of turbine engine components, such as, for example, turbine airfoils, i.e., rotating blades and stationary vanes. In accordance with the present invention, a method for servicing a turbine engine component has been developed.

Referring to FIG. 1, a turbine engine component 10 of the type to be serviced according to an aspect of the present invention is illustrated. In the exemplary embodiment illustrated, the component 10 is a turbine blade 10 having a damaged portion 12 to be replaced, although it is noted that the invention is not intended to be limited to servicing a turbine blade. The damaged portion 12 that is to be replaced according to this embodiment comprises a damaged tip section 12, which is shown in dashed lines in FIG. 1.

The damaged tip section 12 of the blade 10 is removed via any appropriate conventional procedure, such as cutting, milling, grinding, etc., or non-conventional procedure, such as electro discharge machining (EDM), laser or water jet cutting, etc.

Referring to FIG. 2, once the damaged tip section 12 of the blade 10 is removed, an outer surface 14 of the blade 10 adjacent to the location of the removed damaged tip section 12 is machined to form an outer mating surface 16. Any conventional procedure can be performed to remove material from the outer surface 14 of the blade 10 so as to form the outer mating surface 16, such as, for example, milling, grinding, electro-discharge machining, water jet machining, etc. The outer mating surface 16 comprises a stepped surface 18 with the adjacent portion of the outer surface 14 of the blade 10, see FIGS. 3 and 4.

Figure 4:
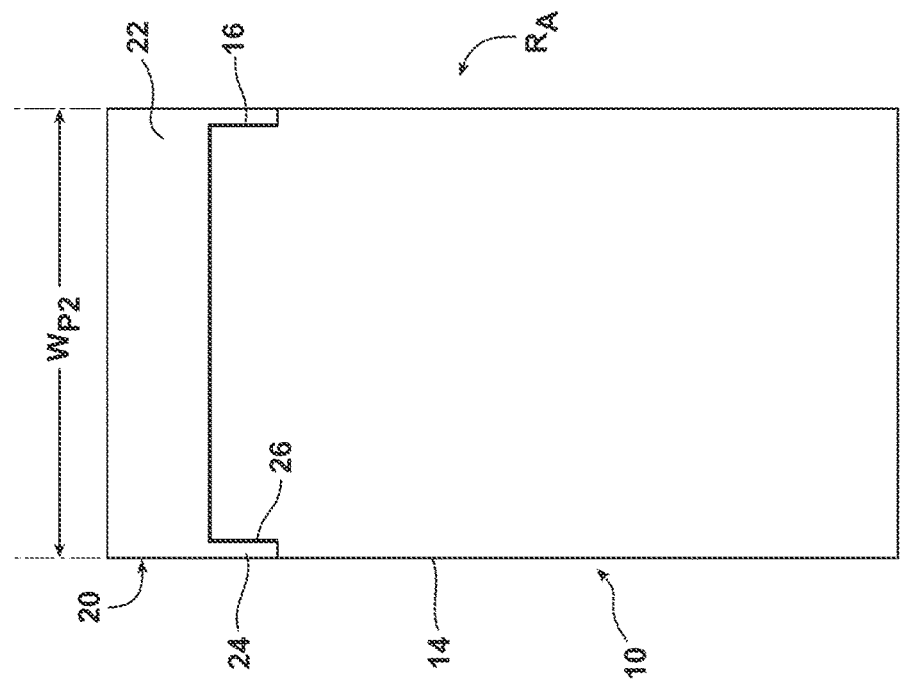

Referring now to FIGS. 3 and 4, a powder coupon 20 is provided to replace the damaged tip section 12 of the blade 10. The powder coupon 20 comprises powder particles that are at most partially sintered or are bonded together with a binder such as a synthetic wax or a polymeric binder, such as polyetylene. The phase "at most partially sintered" as used herein refers to a state of the power coupon 20 wherein the powder particles that form the powder coupon 20 are either not sintered or are partially sintered such that the coupon 20 is able to be structurally held together, but not fully sintered, wherein the phrase "fully sintered" refers to a state of the powder coupon 20 wherein the powder particles forming the coupon 20 haven been completely or have been almost completely sintered to achieve a density of at least about 98% so as to form a fully consolidated component.

The powder particles forming the powder coupon 20 are preferably metallic particles but could also be other types of particles used in powder metallurgy procedures, such as, for example, ceramic particles.

The powder coupon 20 comprises a main body 22 and a rim 24 that extends outwardly from a perimeter of the main body 22. An inner surface of the rim 24 defines an inner mating surface 26 of the powder coupon 20, see FIG. 4. As shown in FIG. 4, a height $H_R$ of the rim 24 may be at least about ⅓ of an overall height $H_P$ of the powder coupon 20, and is preferably about one half of the overall height $H_P$ of the powder coupon 20.

According to an aspect of the present invention, a bonding agent 30, preferably including a substance of the type used in transient liquid phase bonding, such as, for example, a nickel (Ni) based alloy such as NiFlex 110, 115, 120 or 121 bonding alloy agents, which typically contain a balance of Ni with about 9-10% Cr, 5-10% Co, 0-4% Ti, 0-4% Al, 2-5% W, 0-2% Mo, 0-4% Ta and 0-1% Hf, is applied to at least one of the outer mating surface 16 of the blade 10 and the inner mating surface 26 of the powder coupon 20. The bonding agent 30 also preferably includes a melting point suppressant substance, e.g., boron, silicon, germanium, etc., which is provided to lower the melting point of the bonding agent 30.

The powder coupon 20 is then positioned over the blade 10 such that the inner mating surface 26 of the powder coupon 20 is located adjacent to the outer mating surface 16 of the blade 10 with the bonding agent 30 therebetween. As shown most clearly in FIG. 4, an initial width $W_{P1}$ of the powder coupon 20 is slightly larger than a width $W_B$ of the blade 10, thus allowing the powder coupon 20 to be positioned over the blade 10 without the mating surfaces 16, 26 contacting one another.

Figure 5:
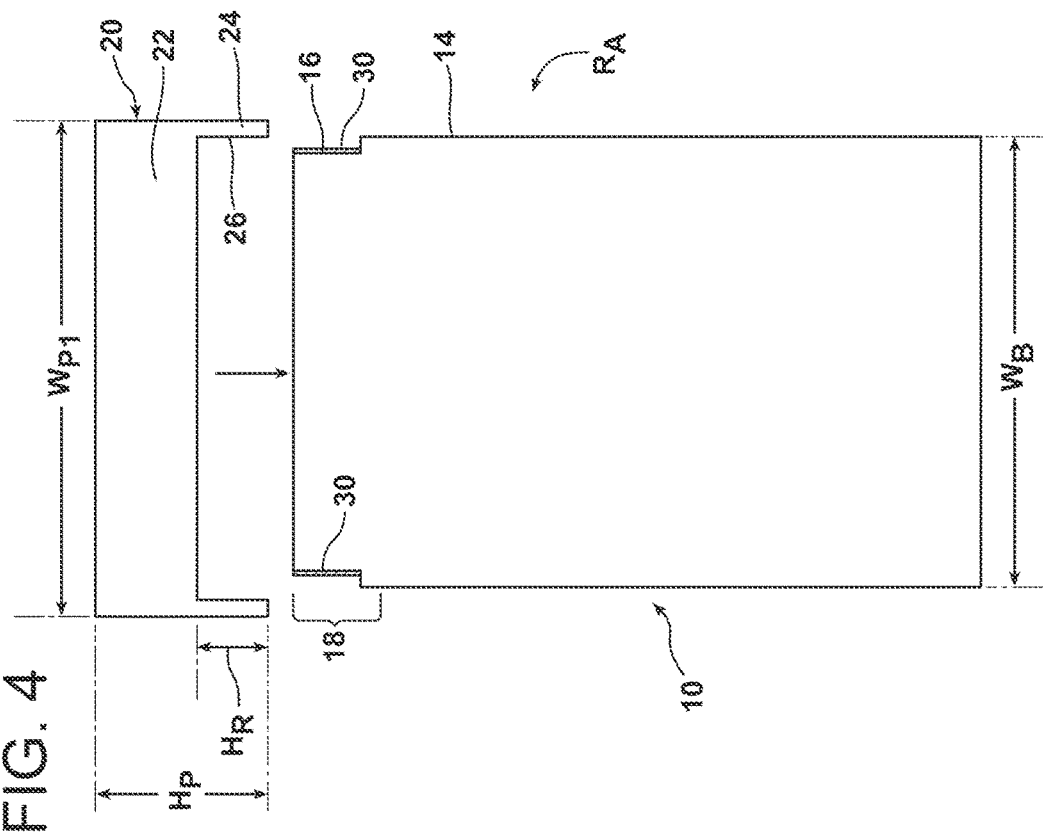
FIG. 5 is a schematic illustration of the component of FIG. 1 after it has undergone the servicing operation according to the present invention.

This assemblage of the blade 10, the powder coupon 20, and the bonding agent 30 forms a replacement assembly $R_A$, which is heated using any conventional heating procedure, such as, for example, by placing the replacement assembly $R_A$ in a furnace (not shown). The applied heat fully sinters the powder particles of the powder coupon 20 so as to bind the powder particles together. The binding of the powder particles together effects a shrinkage of the powder coupon, thus causing the powder coupon 20 to shrink onto the blade 10 and thus providing a pressure to the outer mating surface 16 of the blade 10 to aid the bonding process, e.g., by eliminating pores/closing gaps between the powder coupon 20 and the blade 10, wherein the applied pressure further eliminates the need for fixturing of the powder coupon 20 to the blade 10, thus simplifying the bonding process. A resulting fully sintered width $W_{P2}$ of the powder coupon 20, which is now shrunken as a result of the sintering of the powder particles, is generally equal to the width $W_B$ of the blade 10, see FIG. 5.

The applied heat further activates the bonding agent 30 to bond the inner mating surface 26 of the shrunken powder coupon 30 to the outer mating surface 16 of the blade 10, wherein the rim 24 of the powder coupon 20 is received by the stepped surface 18 defined by the outer mating surface 16 and the adjacent portion of the outer surface 14 of the blade 10. Since the height $H_R$ of the rim 24 is preferably about ½ of the overall height $H_P$ of the powder coupon 20, a contact area of the bond between the powder coupon 20 and the blade 10 is large enough to create a secure connection therebetween, which is believed to be able to withstand the forces and temperatures exerted on the replacement assembly $R_A$ once installed in a turbine engine. Further, since the bonding agent 30 preferably includes a melting point suppressant substance, a lesser amount of heat is required to activate the bonding agent 30 than if the bonding agent 30 did not include a melting point suppressant substance.

It is noted that while the applied heat to the replacement assembly $R_A$ does not sinter the material forming the blade 10, i.e., since the blade 10 was fully consolidated before the heat was applied to the replacement assembly $R_A$, the applied heat may create a rejuvenation treatment for the blade 10 by restoring the original microstructure of the blade 10. For example, if the blade 10 is formed from a nickel based superalloy, heating the blade 10 to a temperature near or above the gamma prime solvus temperature associated with the nickel based superalloy forming the blade 10 will cause solutioning of the strengthening gamma prime particles within the superalloy. The gamma prime will then reprecipitate on cooling such that the coarse over aged gamma prime generated during long term and high temperature service exposure can be restored substantially to its original morphology.

Moreover, while the bond joint between the blade 10 and the powder coupon 20 is formed between two generally planar surfaces in the embodiment shown, features such as interlocking groves and corresponding ridges maybe present on the surfaces of the blade 10 and the powder coupon 20 to produce a mechanically interlocked joint.

According to an aspect of the present invention, before heat is applied to the replacement assembly $R_A$, a cold working or peening procedure may be performed on the outer and/or inner mating surfaces 16, 26 of the blade 10 and/or the powder coupon 20 so as to create a storage of energy in the respective component. The storage of energy is believed to aid in recrystallization and grain growth of the crystals of the respective component so as to effect a strengthening of the bond between the powder coupon 20 and the blade 10.

Additionally, one or more types of cooling features, such as, for example, cooling holes, turbulating features, etc., could be formed in the blade 10 and/or the powder coupon 20 before they are bonded together. If formed in the powder coupon 20, such cooling features could be formed in the powder coupon 20 either during molding, in the green state, or after partial sintering.

While the inventive aspects described herein enable the replacement of a damaged portion of a turbine engine component using a unique combination of powder metallurgy and transient liquid phase bonding as an alternative approach to replacing the entire component, the inventive aspects described herein could also apply to the formation of new components. For example, a new component portion, such as a blade tip, may be formed by a powder coupon and bonded to a remaining portion of the component, such as a remaining portion of a blade, using the methods described herein. Further, as noted above, the inventive aspects described herein could be used to repair or form other components for use in turbine engines, such as, for example, stationary vanes, ring segments, seals, transition panels, etc.

While particular embodiments of the present invention have been illustrated and described, it would be obvious to those skilled in the art that various other changes and modifications can be made without departing from the spirit and scope of the invention.

It is therefore intended to cover in the appended claims all such changes and modifications that are within the scope of this invention.

What is claimed is:

1. A method for replacing a removed damaged portion of a fully consolidated component for use in a turbine engine comprising:
    providing a powder coupon comprising powder particles that are at most partially sintered or are bonded together with a binder;
    applying a bonding agent to at least one of an outer mating surface of the component and an inner mating surface of the powder coupon;
    positioning the powder coupon over the component such that the inner mating surface of the powder coupon is located adjacent to the outer mating surface of the component with the bonding agent therebetween so as to form a replacement assembly comprising the component, the powder coupon, and the bonding agent; and
    applying heat to the replacement assembly, wherein the applied heat:
        fully sinters the powder particles of the powder coupon so as to bind the powder particles together, thus causing the powder coupon to shrink onto the component; and
        activates the bonding agent to bond the inner mating surface of the shrunken powder coupon to the outer mating surface of the component;
    wherein applying heat to the replacement assembly does not sinter materials forming the fully consolidated component and the shrinking of the powder coupon by the sintering of the powder particles effects a width of the shrunken powder coupon being generally equal to a width of the component.

2. The method according to claim 1, further comprising machining an outer surface of the component adjacent to the location of the removed damaged portion using a material removal procedure to form the outer mating surface.

3. The method according to claim 2, wherein the outer mating surface of the component comprises a stepped surface with an adjacent portion of the outer surface of the component.

4. The method according to claim 3, wherein the powder coupon comprises a rim that defines the inner mating surface and that is received by the stepped surface of the component when the shrunken powder coupon is bonded to the component.

5. The method according to claim 1, wherein the inner and outer mating surfaces include features that effect a mechanical interlocking between the shrunken powder coupon and the component.

6. The method according to claim 1, wherein the bonding agent comprises a melting point suppressant substance that lowers the melting point of the bonding agent.

7. The method according to claim 6, wherein the melting point suppressant substance comprises at least one of boron, silicon, and germanium.

8. The method according to claim 1, further comprising, before applying heat to the replacement assembly, cold working or peening at least one of the outer mating surface of the component and the inner mating surface of the powder coupon to create a storage of energy in the at least one of the component and the powder coupon, wherein the storage of energy effects a strengthening of the bond between the powder coupon and the component.

9. The method according to claim 1, wherein the component comprises a turbine blade and the removed damaged portion of the component comprises a damaged blade tip.

10. The method according to claim 1, wherein the applied heat also creates a rejuvenation treatment for the fully consolidated component by substantially restoring the original microstructure of the component.

11. A method for repairing a fully consolidated component for use in a turbine engine comprising:
    removing a damaged portion of the component;
    machining an outer surface of the component adjacent to the location of the removed damaged portion using a material removal procedure to form an outer mating surface comprising a stepped surface with an adjacent portion of the outer surface of the component;
    providing a powder coupon comprising powder particles that are at most partially sintered or are bonded together with a binder;
    applying a bonding agent to at least one of the outer mating surface of the component and an inner mating surface of the powder coupon;
    positioning the powder coupon over the component such that the inner mating surface of the powder coupon is located adjacent to the outer mating surface of the component with the bonding agent therebetween so as to form a replacement assembly comprising the component, the powder coupon, and the bonding agent; and
    applying heat to the replacement assembly, wherein the applied heat:
        fully sinters the powder particles of the powder coupon so as to bind the powder particles together, thus causing the powder coupon to shrink such that the inner mating surface of the powder coupon is shrunken onto the outer mating surface of the component with the bonding agent therebetween; and activates the bonding agent to bond the inner mating surface of the shrunken powder coupon to the outer mating surface of the component;

wherein the shrinking of the powder coupon onto the component exerts a pressure on the outer mating surface of the component so as to aid in the bonding process between the inner mating surface of the shrunken powder coupon and the outer mating surface of the component;

wherein applying heat to the replacement assembly does not sinter materials forming the fully consolidated component and the shrinking of the powder coupon by the sintering of the powder particles effects a width of the shrunken powder coupon being generally equal to a width of the component.

12. The method according to claim 11, wherein the bonding agent comprises a melting point suppressant substance that lowers the melting point of the bonding agent, the melting point suppressant substance comprising at least one of boron, silicon, and germanium.

13. The method according to claim 11, further comprising, before applying heat to the replacement assembly, cold working or peening at least one of the outer mating surface of the component and the inner mating surface of the powder coupon to create a storage of energy in the at least one of the component and the powder coupon, wherein the storage of energy effects a strengthening of the bond between the powder coupon and the component.

14. The method according to claim 11, wherein the powder coupon comprises a rim that defines the inner mating surface and that is received by the stepped surface of the component when the shrunken powder coupon is bonded to the component.

15. The method according to claim 14, wherein a height of the rim is at least about $\frac{1}{3}$ of an overall height of the powder coupon.

16. The method according to claim 14, wherein a height of the rim is about $\frac{1}{2}$ of an overall height of the powder coupon.

17. The method according to claim 11, wherein the component comprises a turbine blade and the damaged portion of the component comprises a damaged blade tip.

18. The method according to claim 11, further comprising forming at least one cooling feature in the powder coupon prior to applying heat to the replacement assembly.

19. The method according to claim 18, wherein the at least one cooling feature comprises at least one of a cooling hole and a turbulating feature.

20. The method according to claim 11, wherein the applied heat also creates a rejuvenation treatment for the fully consolidated component by substantially restoring the original microstructure of the component.

* * * * *